(12) United States Patent
Takeuchi

(10) Patent No.: US 7,554,962 B2
(45) Date of Patent: Jun. 30, 2009

(54) METHOD, MOBILE STATION, AND SOFTWARE PRODUCT FOR ACCESS POINT SELECTION

(75) Inventor: Shojiro Takeuchi, Tokyo (JP)

(73) Assignee: Nokia Corporation, Espoo (FI)

( * ) Notice: Subject to any disclaimer, the term of this patent is extended or adjusted under 35 U.S.C. 154(b) by 383 days.

(21) Appl. No.: 11/385,104

(22) Filed: Mar. 20, 2006

(65) Prior Publication Data

US 2007/0217377 A1    Sep. 20, 2007

(51) Int. Cl.
- H04Q 7/24 (2006.01)
- H04Q 7/20 (2006.01)
- H04B 7/00 (2006.01)

(52) U.S. Cl. ............ 370/338; 370/328; 370/229; 370/310; 370/331; 370/332; 455/525; 455/436; 455/437; 455/432.1; 455/453

(58) Field of Classification Search .......... 370/338, 370/328, 310.2, 310, 229, 235, 331, 332, 370/333, 277; 455/435.2, 435.3, 453, 436

See application file for complete search history.

(56) References Cited

U.S. PATENT DOCUMENTS

| | | | |
|---|---|---|---|
| 5,987,062 | A | 11/1999 | Engwer et al. |
| 7,385,960 | B2 * | 6/2008 | Bansal et al. ............ 370/338 |
| 2003/0139197 | A1 | 7/2003 | Kostic et al. |
| 2005/0053046 | A1 | 3/2005 | Wang |
| 2005/0083840 | A1 * | 4/2005 | Wilson ............ 370/230 |
| 2005/0255847 | A1 * | 11/2005 | Han et al. ............ 455/436 |
| 2006/0014537 | A1 * | 1/2006 | Arai et al. ............ 455/435.1 |
| 2006/0045056 | A1 * | 3/2006 | O'Hara, Jr. ............ 370/338 |
| 2006/0258350 | A1 * | 11/2006 | Roy et al. ............ 455/435.1 |
| 2008/0095048 | A1 * | 4/2008 | Zhong ............ 370/229 |

FOREIGN PATENT DOCUMENTS

EP    1 542 405 A2    6/2005

OTHER PUBLICATIONS

"Performance Improvement of IEEE802.11; Wireless LAN Networks", S. Takeuchi, Feb. 2006, pp. 109-123; Chapter 5, "Performance Improvement of Large IEEE 802.11e WLAN Networks Consisting of Multiple APs".

(Continued)

*Primary Examiner*—Huy Q Phan
(74) *Attorney, Agent, or Firm*—Ware, Fressola, Van Der Sluys & Adolphson, LLP

(57) ABSTRACT

A method, mobile station, and software product are used to select an access point in a wireless local area network (WLAN) for access by the mobile station. This is accomplished by calculating a preference value for each of a plurality of the access points, based upon information regarding current communication characteristics of the access points. That information includes physical signal characteristics of the access points, and current channel loads of the access points, and also the traffic type affecting the current channel loads of the respective access points. The information about channel loads is weighted differently based upon the corresponding traffic types, and may also be calculated differently depending upon whether or not the mobile station is set up to utilize multimedia traffic.

20 Claims, 3 Drawing Sheets

OTHER PUBLICATIONS

IEEE 802.11e (2005) ; IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications; Amendment 8: Medium Access Control (MAC) Quality of Service Enhancements.

"Link Adaptation Strategy for IEEE 802.11 WLAN via Received Signal Strength Measurement", J. Pavon et al. via the internet.

"A Study on Dynamic Load Balance for IEEE 802.11b Wireless LAN", I Papanikos et al. via the internet.

"Decentralized Access Point Selection Architecture for Wireless LANs—Deployability and Robustness", Y. Fukuda et al., via the internet.

"Estimating Signal Strength Coverage for a Wireless Access Point", M. Kappes et al, *IEEE Communications Society*, Globecom 2004, pp. 3264-3269.

"Hot-Spot Congestion Relief in Public-area Wireless Networks", A. Balachandran et al, *Proc. of the Fourth IEEE Workshop on Mobile Computing Systems and Applications (WMCSA '02)*, IEEE 2002.

"An Effective Data Transfer Method by Integrating Priority Control into Multirate Mechanisms for IEEE 802.11 Wireless LANs", K. Saitoh et al, VTC 2002, 2002 IEEE, pp. 55-59, via the internet.

SyncScan: Practical Fast Handoff for 802.11 Infrastructure Networks:, I. Ramani et al, 2002 IEEE, pp. 675-684. via the internet.

Protection and Guarantee for Voice and Video Traffic in IEEE 802.113 Wireless LANs, Y. Xiao et al, 2004 IEEE, pp. 2152-2162. via the internet.

"Access Point Selection Strategy in IEEE 802.113 WLAN Networks", S. Takeuchi et al via the internet.

* cited by examiner

METHOD, MOBILE STATION, AND SOFTWARE PRODUCT FOR ACCESS POINT SELECTION

FIELD OF THE INVENTION

The present invention relates to a wireless local area network (WLAN) environment, and more particularly involves WLAN access point selection.

BACKGROUND OF THE INVENTION

Wireless local area network (WLAN) technology has become very popular in recent years, because of its advantage in price and bandwidth. Nowadays, wireless LAN is mainly used for Internet access, but real-time applications like Voice-over-IP (VoIP) and video-on-demand (Vod) are identified as likely future applications for wireless LAN. To support such new applications, the IEEE 802.11e working group has been discussing a new 802.11 medium access control (MAC) layer protocol. Standard 802.11e is described in "*Wireless LAN Medium Access Control (MAC) and Physical Layer (PHY) Specifications: Medium Access Control (MAC) Quality of Service (QoS) Enhancements*," IEEE Standard 802.11e/D12.0, November 2004. IEEE Standard 802.11e is also referred to in this specification simply as "802.11e."

One of the most important keys to efficiently use the WM (wireless medium) is selection of access points (APs) with which stations (STAs) associate. In the case of the environment of multiple APs, if STAs have no strategy for AP selection, then the wireless bandwidth will be inefficiently used. Strategy for AP selection is often dependent upon a vendor's implementation. Furthermore, if the WLAN networks support 802.11e, it is necessary to consider how to guarantee quality of service (QoS), and wireless bandwidth must be appropriately allocated to multimedia traffic.

The IEEE 802.11e MAC is a standard to support Quality of Service (QoS). 802.11e Hybrid Coordination Function (HCF) can support QoS in 802.11 networks. The HCF provides both a content-based channel access, called enhanced distributed channel access (EDCA), and a controlled channel access, referred to as HCF controlled channel access (HCCA). A QoS-enhanced station (QSTA), which requires a strict QoS support, is allowed to transmit QoS requirement frames (ADDTS request frames) to the QoS-AP (QAP) in order to construct a Traffic Stream (TS). The QAP takes an admission control to accept or deny such a request from QSTAs.

If a request of TS is accepted, the QAP schedules how long QSTAs occupy the wireless medium or when QSTAs should transmit or receive frames. Moreover, in the field of WLAN, radio resource management (RRM) technology has many attentions due to the requirement of efficient use of radio resource. In the environment of multiple APs, RRM becomes very important. If each AP is deployed without any strategies, radio resource is inefficiently utilized. Besides AP deployment, when there are multiple APs (for example, in enterprise environment), STAs has to select one of them to associate with. If those STAs have no strategy with regard to radio resource, the wireless bandwidth will not be efficiently used. Furthermore, in order to support QoS in an environment where multiple APs exist, how to allocate radio resource to real-time traffic must be considered.

Currently, there are already some prior art documents that introduce algorithms for judging access points. Some of those prior art patents utilize algorithms that are based upon current loads and signal characteristics.

For example, consider Engwer et al. (U.S. Pat. No. 5,987,062) titled "Seamless roaming for wireless local area networks." According to the Engwer patent, a wireless local area network allows roaming of a mobile unit to allow it to serially associate with a number of access points of the network fixed backbone. This roaming is supported by an improved measurement of communications link quality, which includes calculating a mean error free length of a test pattern broadcast by each access point and received by a mobile unit. The test pattern is a digital data message. Thus an accurate measurement of link quality is provided which allows a mobile unit to determine whether it should change its association to another access point having improved communications link quality. Further, a load balancing process is provided to balance the communications load amongst a variety of access points, by allowing mobile units also to switch their association with access points in accordance with a current total data rate at any given access point and also considering the number of currently high data rate mobile units associated with a particular access point at any one time.

Also, consider Kostic et al. (U.S. patent application Ser. No. 20030139197) titled "WLAN having load balancing based on access point loading." According to the Kostic application, a network having distribution of access point loading includes access points to which mobile stations can associate themselves based upon access point beacon signal levels and loading levels for the various access points. A mobile station receives beacon signals from various access points and determines a signal strength for the received beacon signals. The mobile station also receives access point loading information from the access points. The mobile station associates with an access point based upon the access point beacon signal strengths and the access point loading information.

Furthermore, consider Wang (U.S. application Ser. No. 20050053046) titled "QoS based load-balance policy for WLAN." According to the Wang application, a load balancing method for a wireless local area network (LAN) which has a plurality of access points is provided in the present invention. The load balancing decision is made by a load balancing module according to traffic conditions and bandwidth availability of each traffic priority class based on a corresponding class of service. The load balancing module is a centralized module which the load balancing decision is determined by the centralized module, or is determined through information exchanges among distributed load balancing modules of the access points. The load balancing decision also takes into consideration of VLANs per VLAN tag basis. Each of the VLANs is defined with the corresponding traffic priority class.

As mentioned, IEEE standard 802.11e defines two access mechanisms for supporting QoS: enhanced distributed channel access (EDCA) and hybrid coordination function controlled channel access (HCCA). 802.11e supports admission control under both EDCA and HCCA. According to the 802.11 standard, STAs are responsible for deciding an AP with which they associate, and a strategy of AP selection is dependent on vendors' implementation. The most familiar way to select AP is to use a RSSI (Received Signal Strength Indicator). However, if STAs associate with an AP whose RSSI value is the highest, then the AP's network may suffer from a heavy load. Thus, some research has taken into account RSSI and also the number of associated STAs for the AP selection decision. This is described in an article by Papanikos et al., "A study on dynamic load balance for IEEE 802.11b wireless LAN," in Proc. of COMCON 2001, 2001. If only best effort traffic is considered, those prior art methods might be acceptable. But, if the AP supports 802.11e, those prior art methods do not maintain QoS, because they do not distinguish traffic types in a WLAN network. Thus, QoS must be carefully treated in the QoS-supported WLAN. Thus, there is a need for this kind AP selection with QoS in mind.

Physical transmission rate is important for efficiently utilizing the radio resource. Taking into account RSSI, a link adaptation method to decide physical transmission rate was proposed by Pavon et al., "Link Adaptation Strategy for IEEE802.11 WLAN via Received Signal Strength Measurement," in Proc. of IEEE ICC2003, June 2003.

The aforementioned prior art, including Engwer, Kostic, Wang, Papanikos, and Pavon, is entirely incorporated herein by reference.

SUMMARY OF THE INVENTION

This present invention provides a way to select an AP with which a STA will associate. An AP is selected in order to efficiently use the wireless bandwidth in WLAN networks supporting IEEE 802.11e. The invention includes a method, system, and algorithm that enhance the WLAN access point selection, wherein the selection algorithm takes into account physical signal characteristics including signal strengths and supported data rates, and also takes into account current loads of the candidate access points. Furthermore, the algorithm takes into account the type of load, in order to define whether a candidate access point is already admitting a lot of multimedia/streaming/real-time traffic, and this load is a significant parameter when considering probability of congestion events in future communication.

Physical transmission rate is important for efficiently utilizing the radio resource. Therefore, in order to select an AP, the algorithm of the present invention considers physical transmission rate, and also considers channel load, and multimedia traffic load.

The method, mobile station (STA), and software product of the present invention are designed to select an access point in the WLAN, for access by the mobile station. This is accomplished by calculating a preference value for each of a plurality of the access points, based at least partly upon information regarding current communication characteristics of the access points. That information includes physical signal characteristics of the access points, and current channel loads of the access points, and also the traffic type affecting the current channel loads of the access points. The information about channel loads is weighted differently based upon the corresponding information about traffic types, and may also depend upon whether the mobile station is set up to utilize multimedia traffic.

DETAILED DESCRIPTION

An algorithm according to the present invention can be implemented either in an AP or in an STA. However, according to the current 802.11 standard, STA is responsible for making a decision about which AP that it associates with. Before connecting to an AP, the STA has to carry out the following steps: Scan, Authentication, and Association; after the scanning process ends, the STA decides which AP it will associate with. Therefore the present embodiment focuses upon the algorithm implemented in STAs.

In order to select an AP, the following information is considered: Channel Load, Physical transmission rate, and Multimedia Traffic Load. Each of these three pieces of information will now be discussed.

Regarding the Channel Load, this is an important factor. It is very useful for finding out whether or not a WLAN network is congested.

Regarding physical transmission rate, the 802.11 standard supports rate diversity (for example, in 802.11b, 1 Mbps, 2 Mbps, 5.5 Mbps and 11 Mbps are supported). When a transmitter uses a higher transmission rate, the use of wireless bandwidth will be more efficient. Therefore, the physical transmission rate is one of the most important factors to decide which APs most efficiently associate with STAs utilizing the wireless bandwidth. In fact, STAs can decide one of multiple physical transmission rates considering radio condition, and they can dynamically control it. Controlling transmission rate is known as link adaptation. To do link adaptation, STAs measure radio condition. In 802.11, RSSI is defined to show received signal strength and is obtained from an RF circuit. In general, if the RSSI is high, a STA or AP can receive a strong signal from an AP or STA respectively, and the radio condition is thought to be good between them. If the radio condition is good, then they can set a high physical rate. Therefore, this embodiment of the invention assumes that the physical transmission rate is decided based upon a link adaptation using RSSI. However other methods, e.g. SNR (signal to noise ratio), can be applied in the proposed algorithm.

Regarding the Multimedia Traffic Load, this is used to find out whether or not an AP can accept more multimedia traffic. If a great deal of traffic is already admitted in the AP, then a STA, which wants to associate with an AP and to transmit real-time traffic, should associate with an AP which accepts less multimedia traffic.

Figure 1:
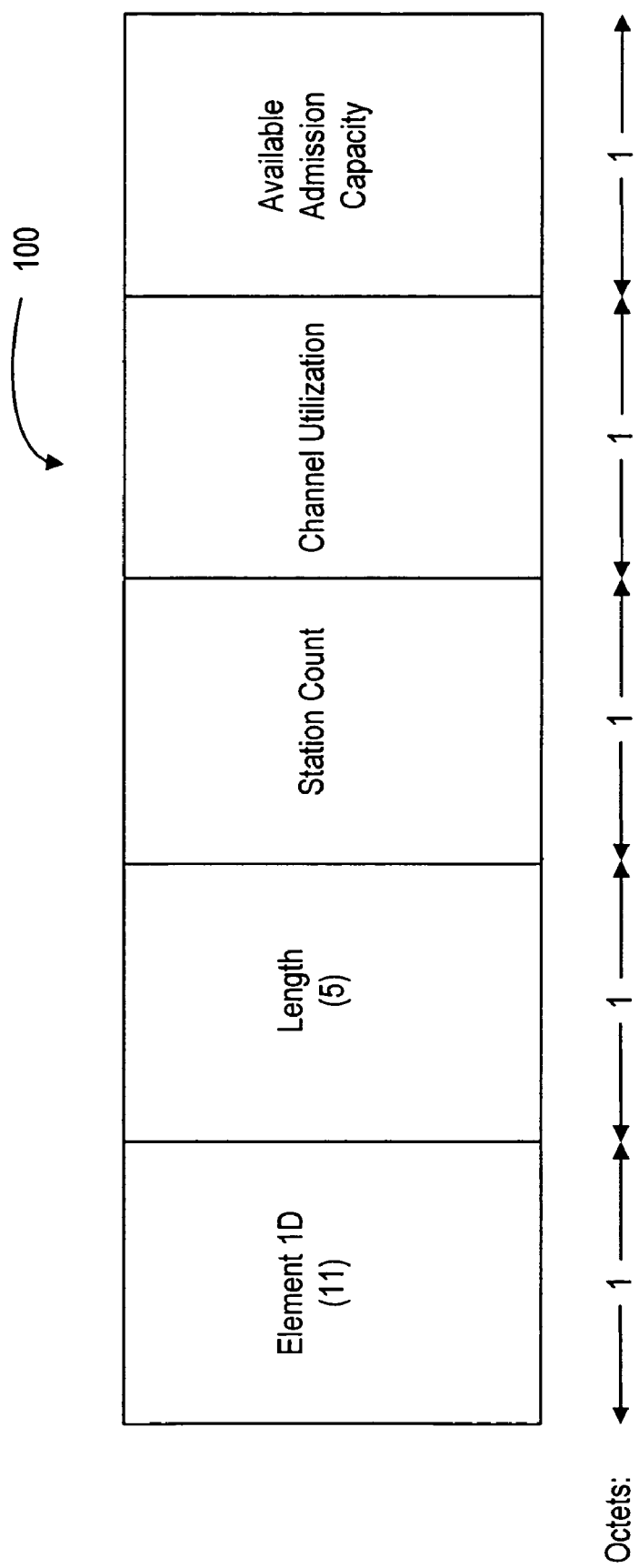
FIG. 1 depicts a QBSS load element format.

STAs can obtain the parameters described above without any change of standard specifications. FIG. 1 shows a QBSS load information element format, which is included in a beacon frame. This frame contains channel load in the channel utilization field, and also includes available admission capacity. The physical transmission rate is decided by the STA itself.

The algorithm according to the present embodiment of the invention can be classified into two parts. One is used for STAs having real-time (i.e. multimedia) traffic. Another is for STAs having non-real-time traffic. In what follows, each of these parts is described, respectively. The basic idea is that STAs try to associate with an AP so that the STAs can use as high a transmission rate as possible if the AP's channel load is not so high, or the difference of channel load among APs is small. When an AP's load is very high, the algorithm allows STAs to access an AP with which they use lower transmission rate. Therefore, the algorithm of the present invention can achieve efficient use of wireless bandwidth.

Consider STAs having real-time traffic. In WLAN networks according to 802.11e, real-time traffic can have more of a chance to access the wireless medium (WM) than non-real-time traffic. Therefore, even if Access Point A's channel load is a little bit more than Access Point B's, it is better for a STA having real-time traffic to select AP A when A's real-time traffic load is little. In the present algorithm, a STA having real-time traffic takes into account AP's multimedia traffic load and physical transmission rate, in order to efficiently use wireless bandwidth.

Before associating with an AP, STAs having real-time traffic calculate a score $S_i$ toward all $AP_i$ ($0 \leq i \leq L-1$) that the STAs can communicate with, according to the following equation (1). Then the STAs associate with an AP which has the highest score.

$$S_i = AAC_i \times R_i \quad (1)$$

In equation (1), $AAC_i$ denotes Available Admission Capacity given from a QBSS Load element. $R_i$ indicates a weight factor defined based upon time needed to transmit a packet whose payload size is M bytes, using one of the physical transmission rates supported in an STA. The way to calculate $R_i$ is as follows:

$$R_i = \frac{T_{max}}{T_i} \quad (2)$$

$$T_{max} = \max\{T_{r_i} \mid 0 \le i \le L-1\} \quad (3)$$

In these equations, $T_{r_i}$ denotes the time taken when a packet whose payload size is M bytes is transmitted using a physical transmission rate $r_i$. For example, when an STA supports 2 Mbps, 5.5 Mbps and 11.0 Mbps, and its basic rate is 2 Mbps, and furthermore M is 1024 bytes, then $R_i$ is calculated considering the physical layer header and MAC header, and $R_i$ is obtained as 1.0 for 2.0 Mbps, 2.6 for 5.5 Mbps, and 5.0 for 11.0 Mbps.

Since $AAC_i$ shows the time remaining to accept real-time traffic, and weight factor $R_i$ shows transmission time, equation (1) can force the STA to associate with an AP that the STA can communicate with using as high a physical transmission rate as possible. If the multimedia traffic load in an AP is high, and the difference of multimedia traffic load among APs is high, then this algorithm allows STAs to associate with another AP with which they have to communicate, using a lower physical transmission rate. Therefore, this algorithm can achieve efficient utilization of wireless bandwidth. Consequently, AP and WLAN networks consisting of multiple APs can accommodate much more traffic.

Now consider STAs having non-real-time traffic. When an AP is selected which has a low channel load, it has more chance to access the wireless medium (WM) in 802.11e WLAN networks. Therefore, the present algorithm for STAs having non-real-time traffic cares about channel load and physical transmission rate, similarly to STAs having real-time traffic.

Before associating with an AP, STAs having non-real-time traffic calculate the following equation (4). An AP whose score is the highest is selected.

$$S_i = (256 - CL_i) \times R_i \quad (4)$$

In equation (4), $CL_i$ denotes channel utilization obtained from QBSS Load element and expressed as an integer value between 0 and 255. Remaining channel capacity is considered in equation (4), because the present algorithm forces STAs to access an AP with which they can communicate using as high a physical transmission rate as possible. Consequently this algorithm of the present invention can achieve efficient utilization of wireless bandwidth.

Suppose STAs have both real-time and non real-time traffic. In that case, the STAs use the algorithm for real-time traffic.

Figure 2:
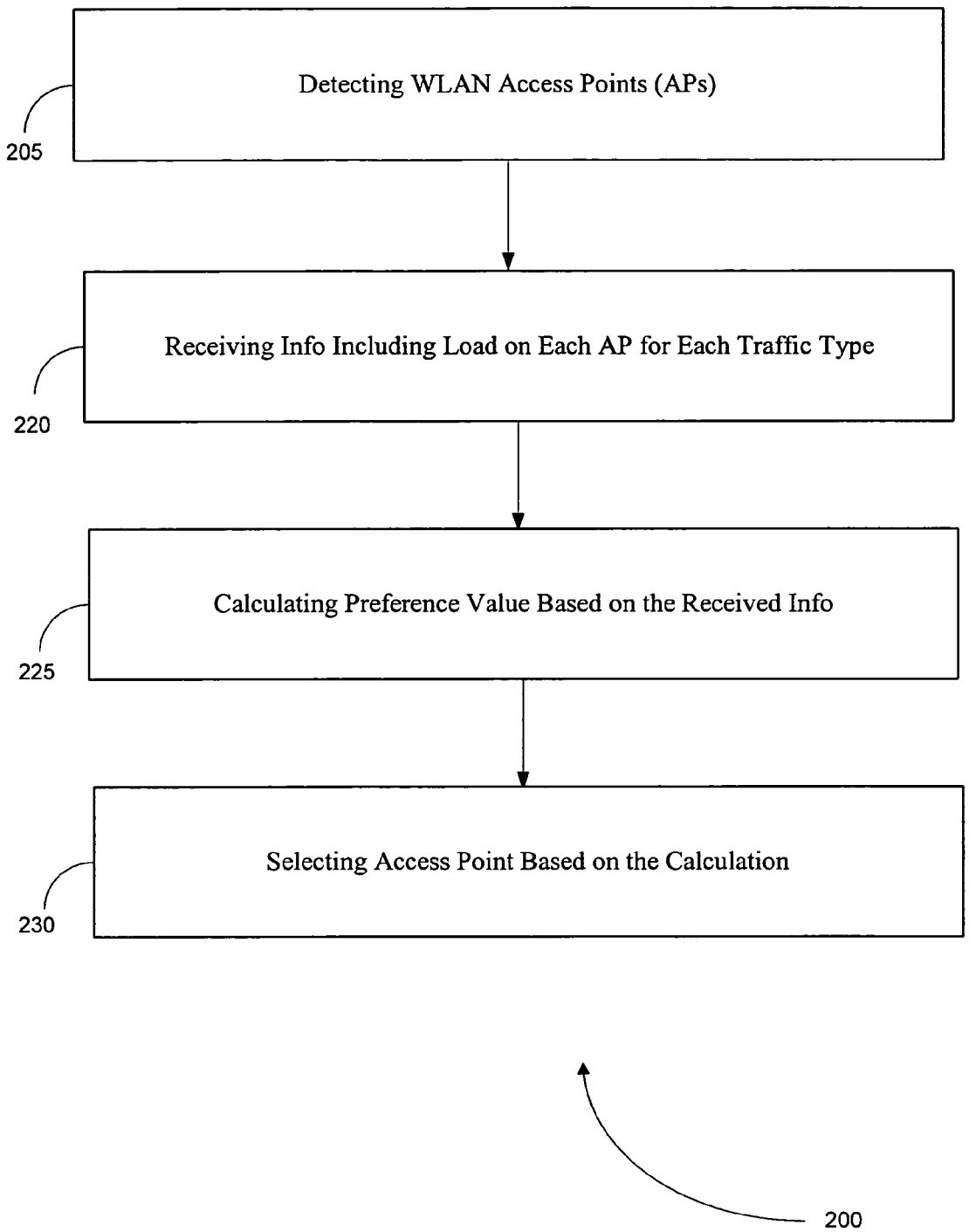
FIG. 2 is a flow chart showing a method according to an embodiment of the present invention.

A method 200 according to this embodiment of the invention is shown in FIG. 2. First, access points are detected 205. Then, information about each access point is received 220, including information about the load on each AP for each traffic type. Then, a preference value for each AP is calculated 225 based at least partly on the received information. Finally, an access point is selected 230 based upon the calculation.

Figure 3:
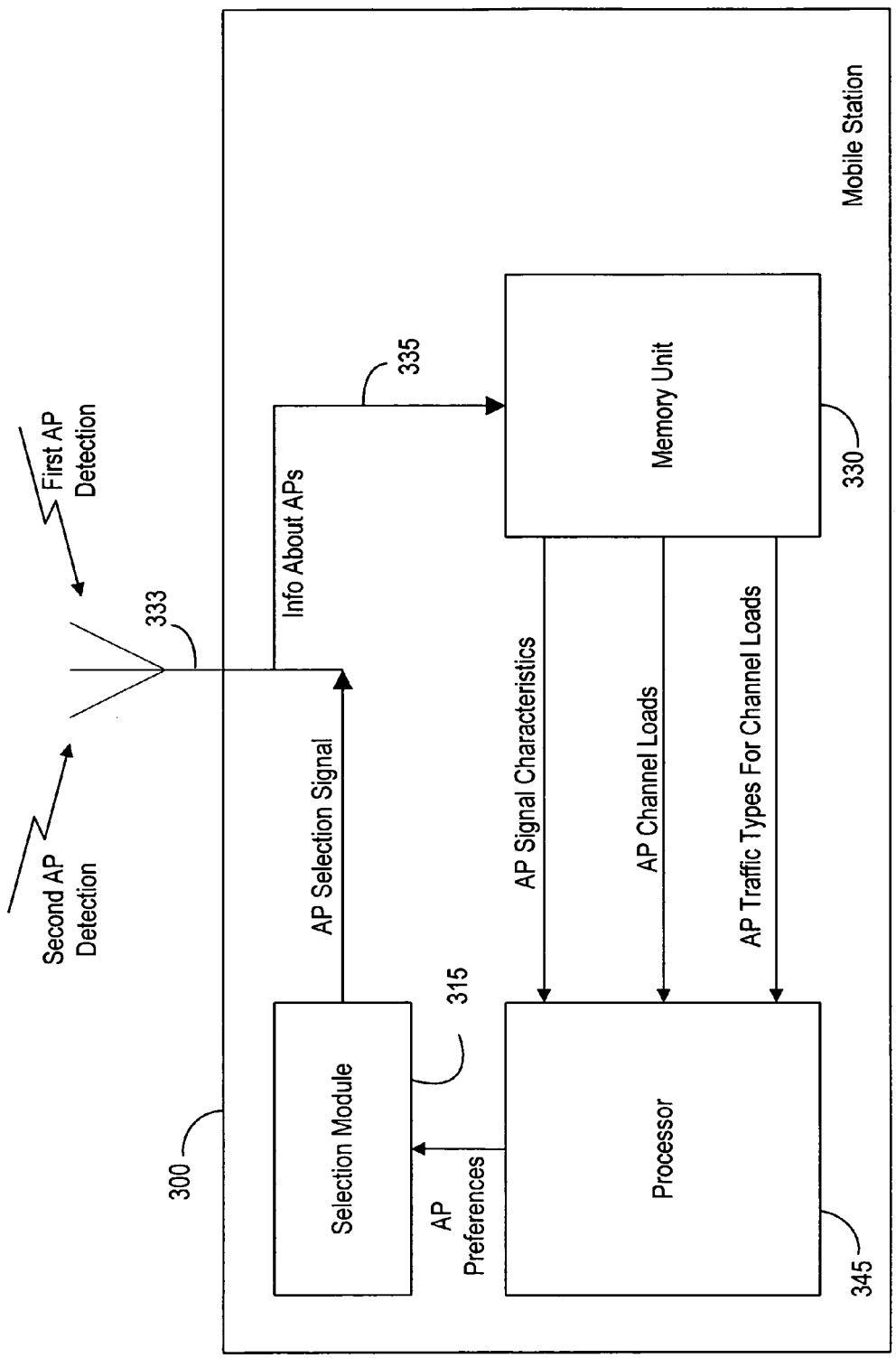
FIG. 3 is a block diagram showing a mobile device according to an embodiment of the present invention.

This method can be implemented, for example, by the mobile station 300 shown in FIG. 3. The transceiver 333 detects a first access point and also detects a second access point. Then, information about those APs is sent 335 to a memory unit 330. Once all of that information has been stored in the memory unit, then the memory unit provides certain data to the processor 345: AP signal characteristics, AP channel loads, and AP traffic types for the channel loads. This data is provided by the memory unit to the processor, for each of the APs that were detected.

The processor then calculates AP preferences, and conveys that to a selection module 315. The selection module then signals the transceiver 333 regarding which AP has been selected. This selection can additionally be based upon the terminal's current application/data needs, such as traffic type (e.g. whether or not the mobile station will be utilizing any multimedia traffic).

The embodiment described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes the CPU processor 345 shown in FIG. 3, comprising a single processing unit, multiple processing units capable of parallel operation, or the CPU can be distributed across one or more processing units in one or more locations, e.g., on a client and server. The computer system also includes a computer readable medium in which are embedded executable codes for carrying Out the invention. Memory 330 may comprise any known type of data storage including magnetic media, optical media, random access memory (RAM), read-only memory (ROM), a data cache, a data object, etc. Moreover, similar to CPU 345, memory 330 may reside at a single physical location, comprising one or more types of data storage, or be distributed across a plurality of physical systems in various forms.

It is to be understood that all of the present figures, and the accompanying narrative discussions of best mode embodiments, do not purport to be completely rigorous treatments of the method, mobile station, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various combinations of hardware and software which need not be further detailed herein.

What is claimed is:

1. A method, comprising:
    detecting at least two network access points;
    receiving information regarding current communication characteristics of each of at least two access points, wherein the information includes parameters relating to physical signal characteristics of the access points, and relating to current channel loads, and relating to traffic type affecting the current channel loads of the at least two access points;
    calculating a preference value for each of the at least two access points based at least on the received information; and selecting an access point for access by a mobile station, based at least upon the calculation
wherein said information at least about said channel loads and said traffic type affecting said channel loads is received wirelessly via a transceiver.

2. The method of claim 1, wherein the information relating to traffic type includes information about capacity to handle more multimedia traffic by each of the access points, and information about capacity to handle more other traffic by each of the access points.

3. The method of claim 2, wherein the selecting step is also based on whether or not the mobile station is for utilizing any multimedia traffic.

4. The method of claim 3, wherein if the mobile station is set up to utilize any multimedia traffic, then the information relating to traffic type includes available admission capacity, and if the mobile station is set up to utilize only non-multimedia traffic then the information relating to traffic type includes channel utilization.

5. The method of claim 2, wherein the capacity to handle more multimedia traffic is weighted differently than the capacity to handle more other traffic.

6. The method of claim 1, further comprising detecting the mobile station that is seeking access to at least one of the access points, wherein the method is performed apart from the mobile station.

7. The method of claim 1, wherein the method is performed within the mobile station.

8. A computer readable medium arranged for causing a processor to execute the method of claim 1.

9. The method of claim 1, wherein the network is a wireless local area network.

10. An apparatus, comprising:
means for detecting at least two network access points;
means for receiving information via the means for detecting, regarding current communication characteristics of each of the two or more access points, wherein the information includes parameters relating to physical signal characteristics of the access points, and relating to current channel loads, and relating to traffic type affecting the current channel loads of the at least two access points;
means for calculating a preference value for each of the at least two access points based at least on the received information stored in the means for receiving; and
means for instructing the means for detecting that a selected access point shall be accessed by the apparatus, wherein the selection is based at least upon the calculation performed by the means for calculating, and
wherein said information at least about said channel loads and said traffic type affecting said channel loads is received wirelessly via a transceiver.

11. The apparatus of claim 10, wherein the apparatus is a mobile station, the means for detecting is a transceiver, the means for receiving is a memory unit, the means for calculating is a processor, and the means for instructing is a selection module.

12. A computer readable medium having executable codes embedded therein, the codes, when executed, being adapted to carry out the functions of:
receiving information regarding current communication characteristics of each of at least two network access points, wherein the information includes parameters relating to physical signal characteristics of the access points, and relating to current channel loads, and relating to traffic type affecting the current channel loads of the at least two access points;
calculating a preference value for each of the at least two access points based at least on the received information; and
selecting an access point for access by a mobile station, based at least upon the calculation,
wherein said information at least about said channel loads and said traffic type affecting said channel loads is received wirelessly via a transceiver.

13. The computer readable medium of claim 12, wherein the information relating to traffic type includes information about capacity to handle more multimedia traffic by each of the access points, and information about capacity to handle more other traffic by each of the access points.

14. The computer readable medium of claim 13, wherein the selecting step is also based on whether or not the mobile station is set to utilize any multimedia traffic.

15. An apparatus, comprising:
a transceiver configured to detect at least two wireless local area network access points and configured to receive information regarding current communication characteristics of each of the two or more access points, wherein the information includes parameters relating to physical signal characteristics of the access points, and relating to current channel loads, and relating to traffic type affecting the current channel loads of the at least two access points;
a processor configured to calculate a preference value for each of the at least two access points based at least on the received information; and
a selection module configured to instruct the transceiver that a selected access point shall be accessed by the apparatus, wherein the selection is based at least upon the calculation performed by the processor,
wherein said information at least about said channel loads and said traffic type affecting said channel loads is received wirelessly via the transceiver.

16. The apparatus of claim 15, wherein the information relating to traffic type includes information about capacity to handle more multimedia traffic by each of the access points, and information about capacity to handle more other traffic by each of the access points.

17. The apparatus of claim 16, wherein the selection is also based on whether or not the apparatus is for utilizing any multimedia traffic.

18. The apparatus of claim 17, wherein if the apparatus is set up to utilize any multimedia traffic, then the information relating to traffic type includes available admission capacity, and if the mobile station is set up to utilize only non-multimedia traffic then the information relating to traffic type includes channel utilization.

19. The apparatus of claim 16, wherein the capacity to handle more multimedia traffic is weighted differently than the capacity to handle more other traffic.

20. The apparatus of claim 15, wherein said transceiver comprises a memory unit configured to receive and store said information.

* * * * *